(12) United States Patent
Mori et al.

(10) Patent No.: US 6,882,404 B2
(45) Date of Patent: Apr. 19, 2005

(54) SCANNING OPTICAL DEVICE AND IMAGE FORMING APPARATUS USING THE SAME

(75) Inventors: Seiichiro Mori, Tochigi (JP); Takeshi Yamawaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 10/463,440

(22) Filed: Jun. 18, 2003

(65) Prior Publication Data
US 2004/0017552 A1 Jan. 29, 2004

(30) Foreign Application Priority Data
Jul. 25, 2002 (JP) ........................................ 2002/216510

(51) Int. Cl.$^7$ .................. G03B 27/52; G03B 27/70; G03B 21/00
(52) U.S. Cl. .................. 355/41; 355/60; 353/31
(58) Field of Search ....................... 355/32, 40–41, 355/47, 60; 427/244, 258; 353/31, 34; 359/205, 216

(56) References Cited

U.S. PATENT DOCUMENTS 5,929,979 A * 7/1999 Okino et al. ................ 355/60
6,201,561 B1 3/2001 Ichikawa ..................... 347/241
6,511,184 B2 * 1/2003 Yamagishi et al. ........... 353/31
6,512,623 B1 * 1/2003 Ishihara ....................... 359/205

FOREIGN PATENT DOCUMENTS

JP          11-352426         12/1999

* cited by examiner

*Primary Examiner*—Henry Hung Nguyen
(74) *Attorney, Agent, or Firm*—Fitzpatrick, Cella, Harper & Scinto

(57) ABSTRACT

An incident optical system introduces a plurality of laser beams to an optical deflector from within a scanning range, the width of the plurality of laser beams being larger than the width of a deflection surface of the optical deflector in a main scanning direction. Principal rays of the plurality of laser beams, separated by a predetermined angle, cross each other near the deflection surface in a main scanning cross-section. A scanning optical device satisfies the expression $\Delta\theta < (4\pi/N) \times (1-\rho)$, where $\Delta\theta$ represents the largest angle between principal rays of two of the plurality of laser beams, N represents the number of deflection surfaces of the optical deflector, and $\rho$ represents the scanning efficiency of the deflection surface, which is the ratio of an image forming range to the theoretical maximum scanning width on the deflection surface of the optical deflector.

16 Claims, 7 Drawing Sheets

SCANNING OPTICAL DEVICE AND IMAGE FORMING APPARATUS USING THE SAME

BACKGROUND OF THE INVENTION

1. Field of the Invention

The present invention generally relates to scanning optical devices and image forming apparatuses using the scanning optical devices. More particularly, the present invention is applicable, for example, to apparatuses using electrophotographic processes, such as laser beam printers, digital multifunction machines, and facsimile machines, in which a plurality of laser beams (luminous fluxes) emitted from a plurality of light sources are reflected and deflected by optical deflectors and target surfaces are optically scanned with scanning optical lens systems so that image data is recorded at high speed.

2. Description of the Related Art

Scanning optical devices using lasers as light sources in digital multifunction machines and laser beam printers (LBPs) are commonly known. In recent years, higher-speed apparatuses have been required. Thus, higher-speed scanning optical devices have been anticipated. In order to realize higher-speed scanning optical devices, for example, the rotation speed of optical deflectors may be increased, thereby increasing the scanning speed.

For higher-speed scanning optical devices, expensive motors must be used because of the rapid rotation of the optical deflector and measures must be taken against excessive heat generation. Moreover, the light sources need to have increased light intensity. These requirements cause the component costs to increase and further increase other costs due to the complicated structure.

Thus, in recent years, lasers having a plurality of light-emitting points have been used as light sources. Also, a plurality of lasers is aligned so that parallel scanning in the sub-scanning direction is performed with a plurality of laser beams. Accordingly, higher-speed performance can be achieved while suppressing the rotation speed of the optical deflector.

In a scanning optical device using a plurality of light sources, for example, the light sources are placed on the same substrate and are separated from each other by a predetermined distance in the main scanning direction and in the sub-scanning direction. A plurality of laser beams emitted from the plurality of light sources is combined to produce a plurality of adjacent beams through an optical element such as a prism, and scanning is then performed with the plurality of adjacent beams.

FIG. 6 is a sectional view, taken along the main scanning direction, of a principal portion of a known scanning optical device using a prism for combining beams.

Referring to FIG. 6, components of two laser beams A and B that are light-modulated and emitted from two light sources 50a and 50b are converted into substantially parallel luminous fluxes (or divergent luminous fluxes) through collimator lenses 51a and 51b, respectively. The converted laser beams A and B pass through apertures 60a and 60b, respectively, and are combined together through a prism 52 to produce a plurality of adjacent beams in the main scanning cross-section. Then, the combined laser beams A and B enter a common cylindrical lens 53 having predetermined refractive power only in the sub-scanning direction, and are focused as linear images which are long in the main scanning direction on a deflection surface (reflection surface) 54a of an optical deflector 54.

The laser beams A and B reflected and deflected at the deflection surface 54a of the optical deflector 54 are focused to spots on a photosensitive drum surface 56 through a scanning optical lens 55 having an fθ characteristic. The optical deflector 54 rotates in the direction indicated by arrow C in FIG. 6, and thus the photosensitive drum surface 56 is scanned with the laser beams A and B in the direction indicated by arrow D in FIG. 6 (main scanning direction) at a constant speed. Accordingly, images are recorded on the photosensitive drum surface 56 functioning as a recording medium.

A BD detector 57 includes a BD lens 58 for detecting synchronization and a BD sensor 59. In order to adjust the timing of the starting point for scanning over the photosensitive drum surface 56 prior to optical scanning, part of the laser beams (BD luminous flux) reflected and deflected by the optical deflector 54 is guided to the BD sensor 59 through the BD lens 58. A Synchronization signal (a BD signal) obtained from a detected output signal from the BD sensor 59 allows adjustment of the timing of the starting point for scanning to record an image onto the photosensitive drum surface 56.

Referring to FIG. 6, the laser beams A and B emitted from the light sources 50a and 50b are focused at predetermined intervals in the sub-scanning direction to form a plurality of scanning lines at the same time. Thus, scanning can be performed at a higher speed as compared to a case in which scanning is performed with a single laser beam, the speed being increased by the number of scanning lines.

A scanning optical device not requiring a prism for combining beams is proposed in Japanese Patent Laid-Open No. 11-352426. In the scanning optical device of this type, principal rays of a plurality of laser beams with a predetermined angle between them in the main scanning direction, which are emitted from a plurality of light sources, enter a deflection surface of an optical deflector so as to almost meet each other on the deflection surface. Hereinafter, this arrangement is referred to as "radial arrangement".

In the scanning optical device disclosed in Japanese Patent Laid-Open No. 11-352426, two incident beams enter the deflection surface from outside of scanning beams that are scanned by the deflection surface. Also, an under-filled scanner (UFS) optical system, in which incident luminous flux having a smaller width than the width of a deflection surface is deflected and scanned, is used. Causing the two beams to cross after the deflection surface allows a reduced amount of vignetting of each of the incident beams on the reflection surface and an increased common scanning range.

Referring to FIG. 7, in a radially arranged optical system, due to the phase difference of the angle $\Delta\theta$, scanning with the laser beam B is initiated $\Delta\theta$ after the scanning with the laser beam A on the target surface.

If the image forming range in the main scanning direction of the laser beams A and B is large, the preceding scanning with the laser beam A by the deflection surface 54a may proceed to scanning with the next deflection surface before the scanning with the laser beam B reaches the end of the scanning by the deflection surface 54a.

Thus, the same position is scanned with the laser beam A twice before the photosensitive drum rotates for the next sub scanning position. This causes an image to be re-recorded on the image recorded immediately before, thus deteriorating the image quality.

Although arranging a plurality of light sources with an angle $\Delta\theta$ between them is advantageous for realizing higher-speed performance, the relationship between the angle $\Delta\theta$ and the image forming range must be appropriately determined. There is a first problem in that inappropriate setting of the relationship between the angle Δθ and the image forming range causes no assurance of high quality images even if higher speed performance is achieved. In the scanning optical device disclosed in Japanese Patent Laid-Open No. 11-352426, incident beams enter a deflection surface from outside of scanning beams. Thus, even if the incident beams cross each other after the deflection surface, the increase in the common scanning range is limited.

There is a second problem in that the scanning efficiency cannot be increased. This phenomena particular to the UFS optical system is based on the following principle. Even if incident beams cross each other after a deflection surface, the common scanning range is limited. In the UFS optical system, light beams enter a deflection surface as luminous fluxes having a width in the main scanning direction smaller than that of the deflection surface. Thus, rotation of an optical deflector for deflection scanning causes an edge between deflection surfaces to affect the incident luminous flux, thus causing vignetting of the incident luminous flux. The vignetting of the luminous flux causes the diameter of the main scanning spot to drastically increase and a significantly reduced light intensity, resulting in deteriorated image quality. Thus, the upper limit of the scanning angle, that is, the scanning efficiency ρ in the UFS optical system is determined from the vignetting. Normally, the scanning efficiency ρ in the UFS optical system is at most approximately 0.7 and does not reach 0.8.

For the least vignetting of the incident luminous flux, the incident luminous flux enters from the center of the scanning range (for example, an optical axis of an fθ lens) so that the incident luminous flux enters a deflection surface as perpendicularly as possible. Accordingly, the width of the incident luminous flux projected onto a deflection surface is minimized and an arrangement least susceptible to vignetting can be achieved.

In a radially arranged optical system, using incident beams that cross after a deflection surface further increases the scanning efficiency.

In the scanning optical device disclosed in Japanese Patent Laid-Open No. 11-352426, incident beams enter a deflection surface with a large angle from outside of the scanning range, thus not providing sufficient scanning efficiency in the UFS optical system.

Moreover, the UFS optical system used, for example, in the scanning optical device disclosed in Japanese Patent Laid-Open No. 11-352426 has a third problem in that the scanning efficiency ρ cannot be set to 0.8 or more.

SUMMARY OF THE INVENTION

It is an object of the present invention to provide a scanning optical device that can readily achieve a high quality image at high speed and an image forming apparatus using the scanning optical device.

It is another object of the present invention to provide a scanning optical device having a simple structure without including an optical element for combining beams and for controlling the beam combination and an image forming apparatus using the scanning optical device.

A radially arranged optical system is used in the present invention. The first problem described above is solved by setting a conditional expression for an angle Δθ and scanning efficiency ρ. The second problem described above is solved by making luminous fluxes incident on a deflection surface perpendicularly, in a UFS optical system. The third problem described above is solved by using an OFS scanning system.

In order to solve the first, second, and third problems described above, a scanning optical device according to the present invention includes a plurality of light sources emitting a plurality of laser beams. An optical deflector deflects the plurality of laser beams with at least one deflection surface thereof, and an incident optical system introduces the plurality of laser beams to the optical deflector. A scanning optical lens system focuses the plurality of deflected laser beams onto a target surface to be scanned at predetermined intervals in a sub-scanning direction. The incident optical system introduces the plurality of laser beams to the optical deflector from within a scanning range, the width of the plurality of laser beams being larger than the width of the deflection surface in a main scanning direction. Principal rays of the plurality of laser beams, separated by a predetermined angle, cross each other near the deflection surface in a main scanning cross-section. The scanning optical device satisfies the expression Δθ<(4π/N)×(1−ρ), where Δθ represents the largest angle between principal rays of two of the plurality of laser beams, N represents the number of deflection surfaces of the optical deflector, and ρ represents the scanning efficiency of the deflection surface, which is the ratio of an image forming range to the theoretical maximum scanning width on the deflection surface of the optical deflector.

According to the present invention, for principal rays of a plurality of laser beams emitted from a plurality of light sources incident on a deflection surface of an optical deflector with an angle of Δθ between them in a main scanning cross-section (radial arrangement), each element is appropriately set so that the expression Δθ<(4π/N)×(1−ρ) is satisfied. Thus, a scanning optical device that can readily realize a high quality image at high speed and an image forming apparatus using the optical scanning device can be achieved.

The scanning optical device according to the present invention does not need a prism for combining beams so that optical axes of a plurality of laser beams meet each other. Also, the scanning optical device does not need an optical element for controlling the beam combination. Thus, a scanning optical device with a simple structure that realizes high-speed performance at a lower cost and an image forming apparatus using the scanning optical device can be achieved.

Further objects, features and advantages of the present invention will become apparent from the following description of the preferred embodiments with reference to the attached drawings.

DESCRIPTION OF THE PREFERRED EMBODIMENTS

Technical means (conditions) for achieving the objects of the present invention will be described with reference to FIGS. 3 and 4.

Figure 3:
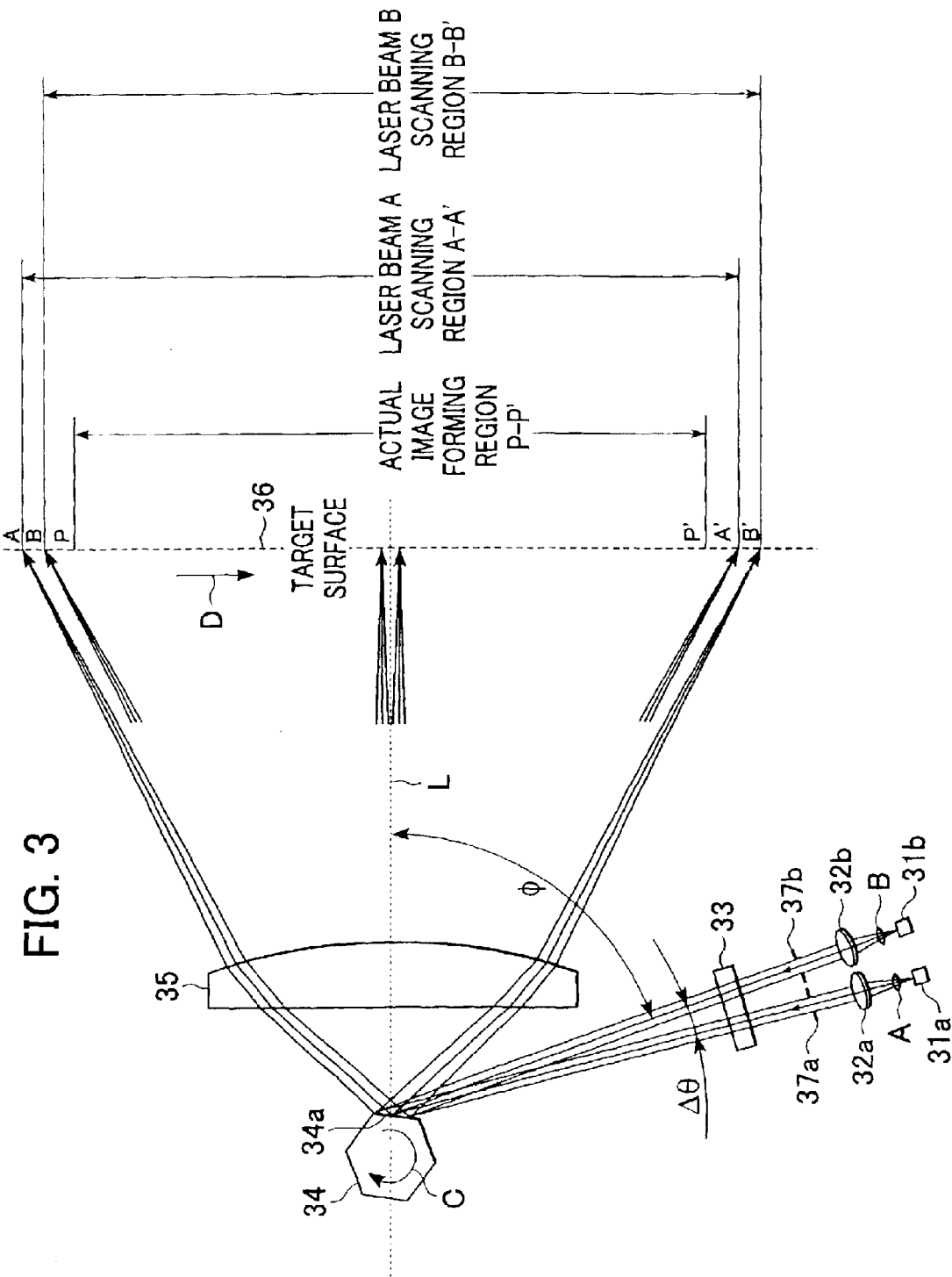
FIG. 3 is a sectional view, taken along the main scanning direction, of a principal portion of a scanning optical device according to the present invention.
Figure 4:
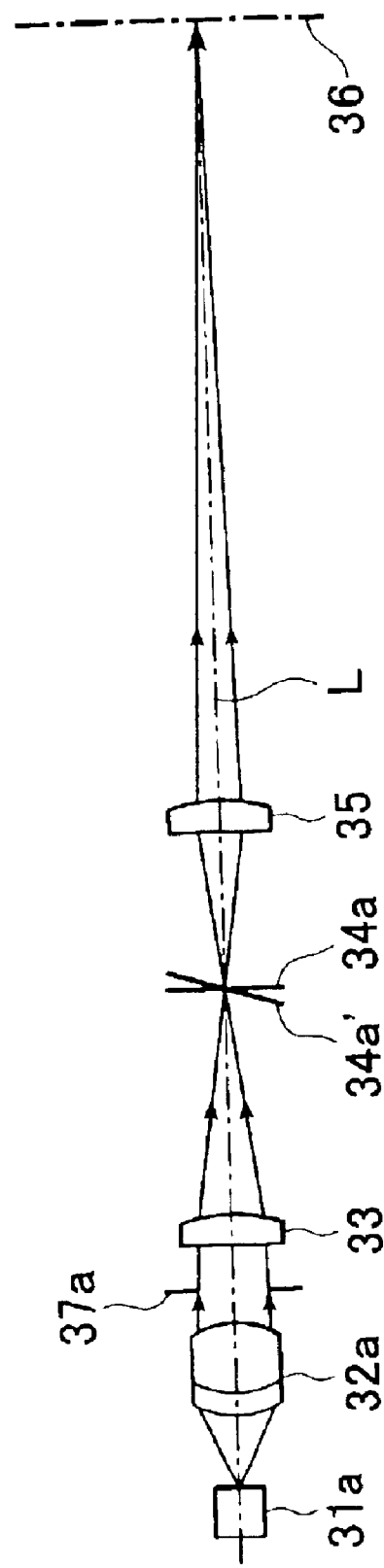
FIG. 4 is a sectional view, taken along the sub-scanning direction, of a principal portion of the scanning optical device according to the present invention.

FIG. 3 is a sectional view, taken along the main scanning direction, of a principal portion of a scanning optical device according to the present invention, and FIG. 4 is a sectional view, taken along the sub-scanning direction, of a principal portion of the scanning optical device.

In the description of the present invention, the direction in which laser beams are reflected and deflected by an optical deflector (deflection scanning of laser beams is performed by an optical deflector) is referred to as the main scanning direction, and the direction orthogonal to an optical axis of a scanning optical lens system and the main scanning direction is referred to as the sub-scanning direction. The cross-section of the scanning optical device taken along a plane perpendicular to the rotational axis of the optical deflector is referred to as the main scanning cross-section, and the cross-section taken along a plane in the rotation axis direction of the optical deflector and orthogonal to the main scanning cross-section is referred to as the sub-scanning cross-section.

Although two light sources (lasers) $31a$ and $31b$ emitting laser beams A and B, respectively, are used in the example shown in FIG. 3, for the sake of a simple explanation, a scanning optical device having more than two light sources can be arranged similarly.

Components of the laser beams A and B, which are modulated and emitted from the light sources $31a$ and $31b$, are converted into substantially parallel luminous fluxes through collimator lenses $32a$ and $32b$, respectively. The diameter of the converted laser beams A and B are determined by apertures $37a$ and $37b$, respectively. The determined laser beams A and B are incident on a deflection surface (reflection surface) $34a$ of an optical deflector 34 through a common cylindrical lens 33 having predetermined refractive power only in the sub-scanning direction so that the laser beams A and B are focused only in the sub-scanning direction.

In the main scanning cross-section, the laser beams A and B are incident on the deflection surface $34a$ from outside of luminous fluxes scanned by a scanning optical lens 35 at an angle of $\phi$ with respect to an optical axis L, and principal rays of the laser beams A and B, separated by an angle of $\Delta\theta$, cross each other near the deflection surface $34a$.

In the main scanning cross-section, the laser beams A and B are not focused at the deflection surface $34a$. The components of the laser beams A and B are incident on the scanning optical lens 35 as substantially parallel luminous fluxes. Then, the laser beams A and B are focused onto a target surface 36 to be scanned, due to the refractive power in the main scanning direction of the scanning optical lens 35.

In the sub-scanning cross-section, as shown in FIG. 4, the deflection surface $34a$ of the optical deflector 34 and the target surface 36 have a conjugate relationship with respect to the scanning optical lens 35. Thus, luminous fluxes focused near the deflection surface $34a$ are focused to spots onto the target surface 36 through the scanning optical lens 35. This conjugate relationship prevents deviation of the focusing position in the sub-scanning direction on the target surface 36 even with a tilted deflection surface $34a'$, thus preventing uneven pitch. In other words, a tilt correction system is arranged.

Referring to FIG. 3, scanning ranges of the laser beams A and B emitted from the light sources $31a$ and $31b$, separated by the angle $\Delta\theta$, will now be described. The laser beam A is reflected and deflected at the deflection surface $34a$ and is then focused to a spot in a region A–A' through the scanning optical lens 35. The laser beam B is focused to a spot in a region B–B'. The region A–A' and the region B–B' represent the theoretical maximum scanning widths on one deflection surface. In practice, an image is formed in a region P–P', which is within the common scanning range of the region A–A' and the region B–B'.

The region P–P' is not coincident with the common scanning range of the region A–A' and the region B–B' because the timing of a starting point for scanning is detected and the light intensity and the like are adjusted in the common scanning range.

Scanning efficiency is represented by $\rho$, which is given by the following equation:

$$\rho = (P-P')/(A-A').$$

More specifically, the ratio of an image forming range to the theoretical maximum scanning width on one deflection surface of an optical deflector is defined as the scanning efficiency $\rho$ of the deflection surface.

In scanning a target surface, a scanning range by one of the surfaces around the circumference of an optical deflector, in theory, is represented by the following expressions:

$4\pi f/N$, for the region A–A' and the region B–B', and $(4\pi f/N) \times \rho$, for the image forming region P–P', where f represents the focal length of a scanning lens and N represents the number of surfaces of the optical deflector.

The laser beams A and B have a separation of $\Delta\theta$ between them. Thus, the maximum image forming width as a common scanning range is represented by the expression $4\pi f/N - \Delta\theta \times f$. The conditions for preventing a laser beam from recording the same scanning line twice are represented by the following expression:

$$(4\pi f/N) \times \rho < 4\pi f/N - \Delta\theta \times f.$$

In other words, this is also represented by the following expression:

$$(4\pi/N) \times \rho < 4\pi/N - \Delta\theta.$$

This expression can be transformed into the following expression:

$$\Delta\theta < (4\pi/N) \times (1-\rho).$$

As described above, a scanning optical device arranged so that the conditions described above are satisfied enables high-speed scanning with a plurality of beams while maintaining high optical performance such as high image quality.

The embodiments of the present invention will now be described with reference to the drawings in view of the foregoing description.

First Embodiment

Figure 1:
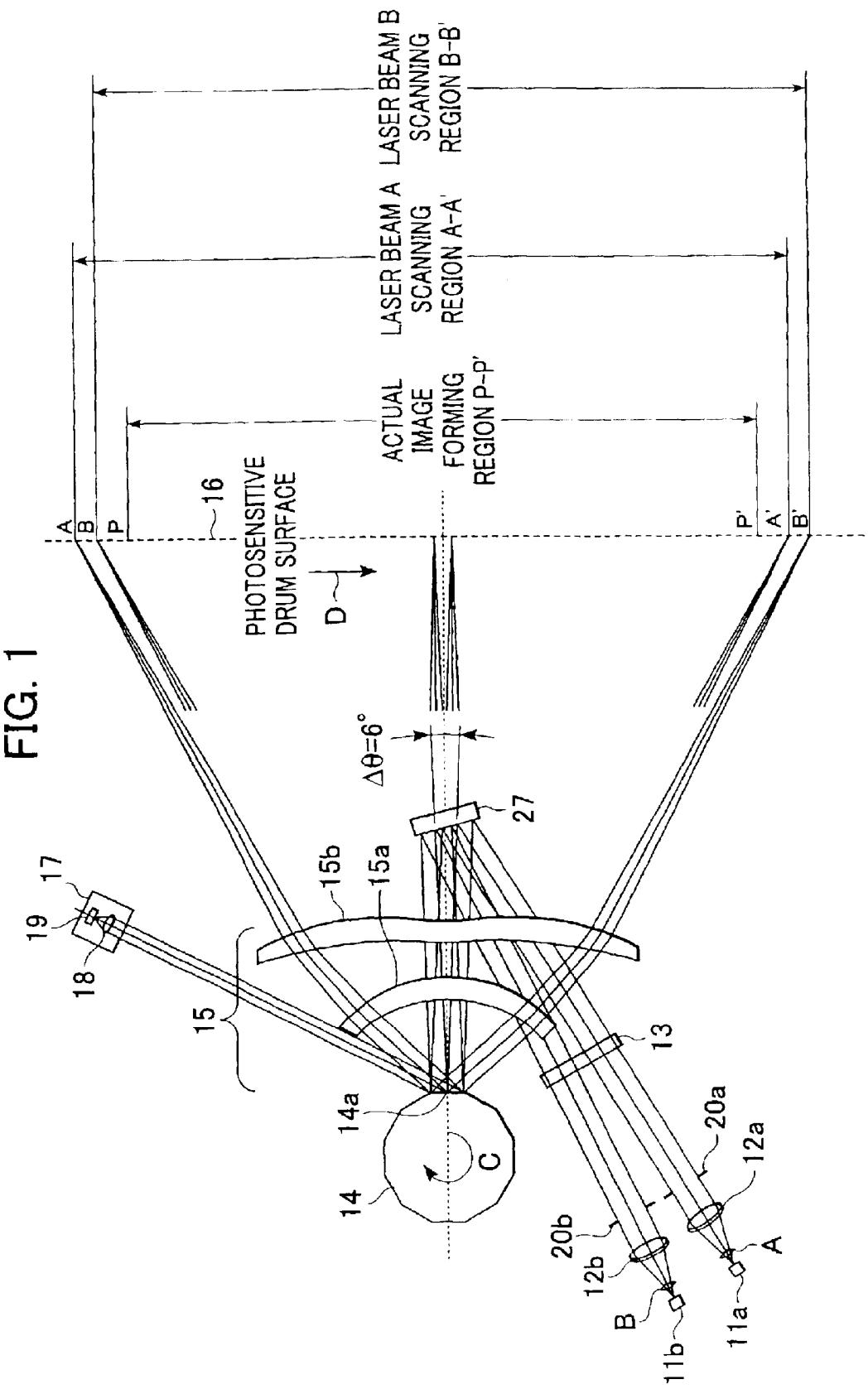
FIG. 1 is a sectional view, taken along a main scanning direction, of a scanning optical device according to a first embodiment and a second embodiment of the present invention.

FIG. 1 is a sectional view, taken along the main scanning direction, of a scanning optical device according to a first embodiment of the present invention.

Figure 2:
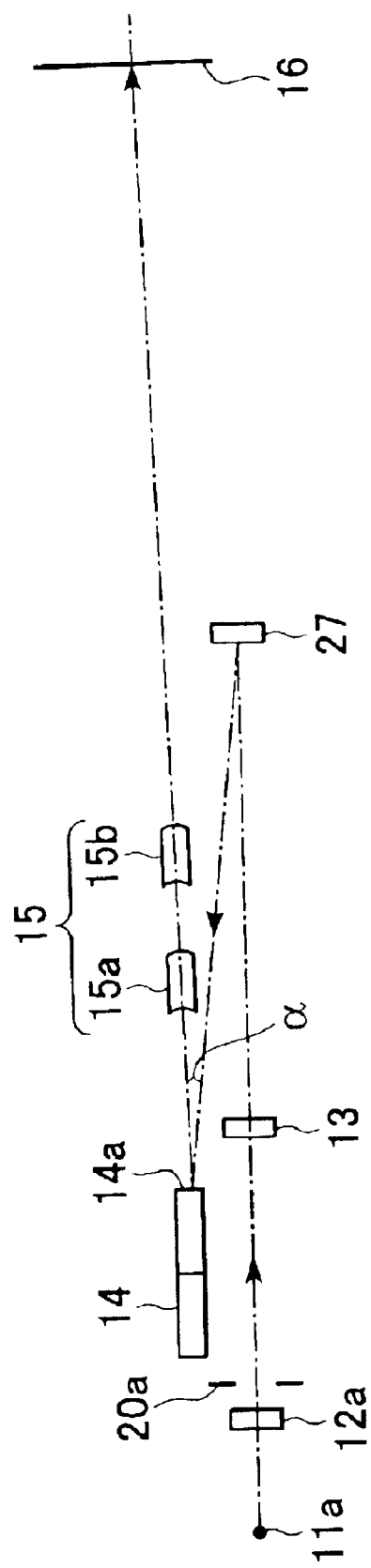
FIG. 2 is a sectional view, taken along a sub-scanning direction, of the scanning optical device according to the first embodiment and the second embodiment.

FIG. 2 is a sectional view, taken along the sub-scanning direction, of the scanning optical device according to the first embodiment.

The configuration of the main scanning cross-section of the scanning optical device according to the present invention will be described with reference to FIG. 1.

Components of the laser beams A and B, which are modulated and emitted from two semiconductor lasers 11a and 11b that are separated from each other, are converted into substantially parallel luminous fluxes through collimator lenses 12a and 12b, respectively. The principal rays of the laser beams A and B pass through the center of apertures 20a and 20b, respectively, and are incident on a common cylindrical lens 13. Then, the principal rays of the laser beams A and B are incident, through a mirror 27, on a deflection surface 14a from an optical axis of a scanning optical lens system 15 so that the principal rays of the laser beams A and B, separated by an angle of $\Delta\theta$, cross each other near the deflection surface 14a.

The width in the main scanning direction of the luminous fluxes of the laser beams A and B incident on the deflection surface 14a is set to be sufficiently larger than the width of the deflection surface 14a of an optical deflector 14. In other words, the scanning optical device according to the first embodiment uses an over-filled scanner (OFS) scanning system.

The optical deflector 14 comprises a polygon mirror having twelve planes (a rotating polygon mirror). The optical deflector 14 is rotated at a constant speed in the direction indicated by arrow C in FIG. 1 by driving means such as a motor (not shown).

The scanning optical lens system 15, functioning as an f$\theta$ lens system, has a converging function and an f$\theta$ characteristic, and includes a first scanning lens 15a and a second scanning lens 15b. The scanning optical lens system 15 focuses the laser beams A and B based on image data reflected and deflected by the optical deflector 14 onto a photosensitive drum surface 16, which is a target surface to be scanned. Each of the first scanning lens 15a and the second scanning lens 15b has power in the main scanning direction and in the sub-scanning direction, and the aberrations of the first scanning lens 15a and the second scanning lens 15b are satisfactorily corrected. The first scanning lens 15a and the second scanning lens 15b are made from optical plastics formed by injection molding using a die, thus having a great flexibility of shape and sufficiently enabling mass production.

A synchronization position detector (BD detector) 17 includes an imaging lens 18 (hereinafter, referred to as a BD lens 18) for detecting synchronization and a synchronization sensor 19 (hereinafter, referred to as a BD sensor 19). The BD lens 18 focuses part of laser beams (BD luminous fluxes) reflected and deflected at the deflection surface 14a of the optical deflector 14 onto a surface of the BD sensor 19. The semiconductor lasers 11a and 11b adjust the timing of a starting point for scanning to record an image onto the photosensitive drum surface 16 in accordance with a synchronization signal (a BD signal) obtained from a detected output signal from the BD sensor 19.

The laser beams A and B reflected and deflected at the deflection surface 14a of the optical deflector 14 are focused to spots onto the photosensitive drum surface 16 through the first scanning lens 15a and the second scanning lens 15b. Rotation of the optical deflector 14 in the direction indicated by arrow C in FIG. 1 allows optical scanning over the photosensitive drum surface 16 in the direction indicated by arrow D in FIG. 1 (main scanning direction) at a constant speed. Accordingly, an image is recorded onto the photosensitive drum surface 16 which is functioning as a recording medium.

The configuration of the sub-scanning cross-section of the scanning optical device will now be described with reference to FIG. 2.

Components of the laser beams A and B are converted into substantially parallel luminous fluxes through the collimator lens 12a and the collimator lens 12b (not shown). The principal rays of the converted laser beams A and B pass through the center of the aperture 20a and the aperture 20b (not shown), and are incident on the cylindrical lens 13 to be focused as linear images which are long in the main scanning direction near the deflection surface 14a. Here, in the sub-scanning cross-section, the laser beams A and B are obliquely-incident on the deflection surface 14a at an angle of a with respect to the main scanning cross-section in order to prevent the interference of light beams reflected at the deflection surface 14a for scanning.

The deflection surface 14a of the optical deflector 14 and the photosensitive drum surface 16 has a conjugate relationship with respect to the scanning optical lens system 15. The scanning optical lens system 15 has a tilt correction function in which refocusing the beam focused near the deflection surface 14a onto a target surface prevents deviation of the focusing position on the target surface even with a tilted deflection surface.

The laser beams A and B emitted from the semiconductor laser 11a and the semiconductor laser 11b (not shown) are focused at predetermined intervals in the sub-scanning direction to form two scanning lines at the same time, thus enabling high-speed scanning at double the speed.

As mentioned above, in the OFS scanning system, the deflection surfaces move within the range covered by the width of the incident luminous fluxes and deflection scanning is performed with luminous fluxes whose diameter is determined from the width in the main scanning direction of the deflection surfaces, thus not causing a vignetting problem, unlike the UFS optical system. Accordingly, the OFS scanning system theoretically achieves 100% scanning efficiency, thus being advantageous as compared to the UFS optical system. It is, however, desirable in the OFS scanning system that laser beams enter the deflection surface from the optical axis of the scanning lens due to the necessity to reduce the light intensity distributed on the target surface.

Also, in the OFS optical system, an optical deflector having the same size and an increased number of deflection surfaces compared to the UFS system can be used. Thus, effects of high-speed scanning can be achieved by increasing the number of deflection surfaces of the optical deflector.

In the first embodiment, the principal rays of the laser beams A and B emitted from the semiconductor lasers 11a and 11b are incident on the deflection surface 14a of the optical deflector 14, the principal rays being not parallel to each other in the main scanning cross-section, as described above. Here, each element of the scanning system is arranged so that the following expression is satisfied:

$$\Delta\theta < (4\pi/N) \times (1-\rho) \qquad (1),$$

where $\Delta\theta$ represents an angle between the principal rays of the laser beams A and B at the deflection surface 14a of the optical deflector 14, N represents the number of deflection surfaces of the optical deflector 14, and $\rho$ represents the scanning efficiency of the deflection surface 14a. Thus, the scanning optical device according to the first embodiment can maintain high optical performance such as high image quality even with high-speed scanning with a plurality of beams.

More specifically, the angle Δθ between the principal rays of the laser beams A and B incident on the deflection surface 14a of the optical deflector 14 is 6 degrees, which is equal to 0.1047 rad, and the optical deflector 14 has twelve deflection surfaces. Here, the scanning efficiency ρ of the deflection surface 14a is 0.8, thus realizing a scanning efficiency that cannot be achieved by the UFS optical system.

In theory, if the left side and the right side of expression (1) are equal, the scanning efficiency is 0.90. In practice, however, the times for detecting a BD signal and the light intensity are needed in the common scanning range by the laser beams A and B, and thus the scanning efficiency is suppressed to approximately 0.8.

If the scanning optical device is arranged as described above, the following values are obtained from expression (1):

$$\Delta\theta = 0.1047$$

$$(4\pi/N) \times (1-\rho) = 0.2094.$$

These values satisfy expression (1).

As described above, in the scanning optical device according to the first embodiment, each element is arranged so that expression (1) is satisfied in order to synchronize the scanning phases. Thus, a scanning optical lens system capable of high-speed scanning with high performance can be achieved.

It is desirable that the scanning efficiency ρ be set to as high a value as possible.

Although scanning with a plurality of beams enables high-speed scanning without increasing the rotation speed of the polygon motor, it is necessary, in order to achieve more efficient scanning, to reduce the amount of unproductive time not forming the image by increasing the proportion of the effective range used for actual image formation with one deflection surface to the entire scanning range.

Using an fθ lens with a constant focal length, the increase in the number of deflection surfaces results in a decrease in the angular range that can be theoretically scanned. Increasing the scanning efficiency ρ by the increase ratio of the number of deflection surfaces, however, allows the same image formation width to be scanned. Thus, an increased scanning efficiency results from an increase in the number of deflection surfaces, thus realizing high-speed scanning.

In the first embodiment, the scanning efficiency ρ set to 0.90 or more does not allow for an effective scanning range. This causes problems, such as recording images twice, thus the scanning efficiency ρ should be below 0.90.

Second Embodiment

A scanning optical device according to a second embodiment of the present invention that is arranged differently from that in the first embodiment will now be described. Each element of the scanning optical device according to the second embodiment is set so that expression (1) is satisfied, as in the first embodiment.

The angle Δθ between the principal rays of the laser beams A and B incident on the deflection surface 14a of the optical deflector 14 is set to a small value, such as 4 degrees, which is equal to 0.0698 rad, by arranging an incident optical system by mechanical means. Here, the angle Δθ and the scanning efficiency ρ of the deflection surface in the scanning optical device according to the second embodiment allow the laser beams to be used more efficiently than that in the first embodiment.

In theory, if the left side and the right side of expression (1) are equal, the scanning efficiency is 0.933. In practice, however, the times for detecting a BD signal and the light intensity are needed in the common scanning range by the laser beams A and B. By minimizing the times as much as possible, the scanning efficiency can reach approximately 0.9.

The optical deflector 14 used in the second embodiment has twelve deflection surfaces as in the first embodiment.

If the scanning optical device is arranged as described above, the following values are obtained from expression (1):

$$\Delta\theta = 0.0698$$

$$(4\pi/N) \times (1-\rho) = 0.1047.$$

These values satisfy expression (1).

As described above, in the scanning optical device according to the second embodiment, each element is arranged so that expression (1) is satisfied in order to synchronize the scanning phases. Thus, a scanning optical lens system capable of high-speed scanning with high performance can be achieved.

Although the scanning optical lens system used in the first and second embodiments is formed by two lenses, the scanning optical lens system may be formed by one lens or more than two lenses.

Although a common cylindrical lens is used for a plurality of light sources in the first and second embodiments, a plurality of cylindrical lenses may be used for the plurality of light sources.

The scanning optical lens system according to the present invention may be a scanning optical lens, a diffractive optical element, or a scanning optical mirror.

The optical deflector used in the present invention may be a rotating polygon mirror such as a polygon motor. Alternatively, the optical deflector may be a galvanometer mirror having one deflection surface.

Although the two semiconductor lasers 11a and 11b are placed radially in the first and second embodiments, the present invention is not limited to this. More than two semiconductor lasers that are placed radially may be used.

For example, if four semiconductor lasers 11a, 11b, 11c, and 11d are placed radially in that order in the main scanning direction, the angle Δθ in expression (1) represents the angle between principal rays of the laser beam A and a laser beam D, which is the largest angle among the angles between each of the principal rays of the laser beam A, laser beam B, laser beam C, and laser beam D.

Although each of the semiconductor lasers 11a and 11b shown in FIG. 1 has one light-emitting point, a semiconductor laser having a plurality of light-emitting points may be used.

Although the semiconductor lasers 11a and 11b shown in FIG. 1 are separated from each other, the semiconductor lasers 11a and 11b may be integrated with each other, with a member therebetween.

Image Forming Apparatus

Figure 5:
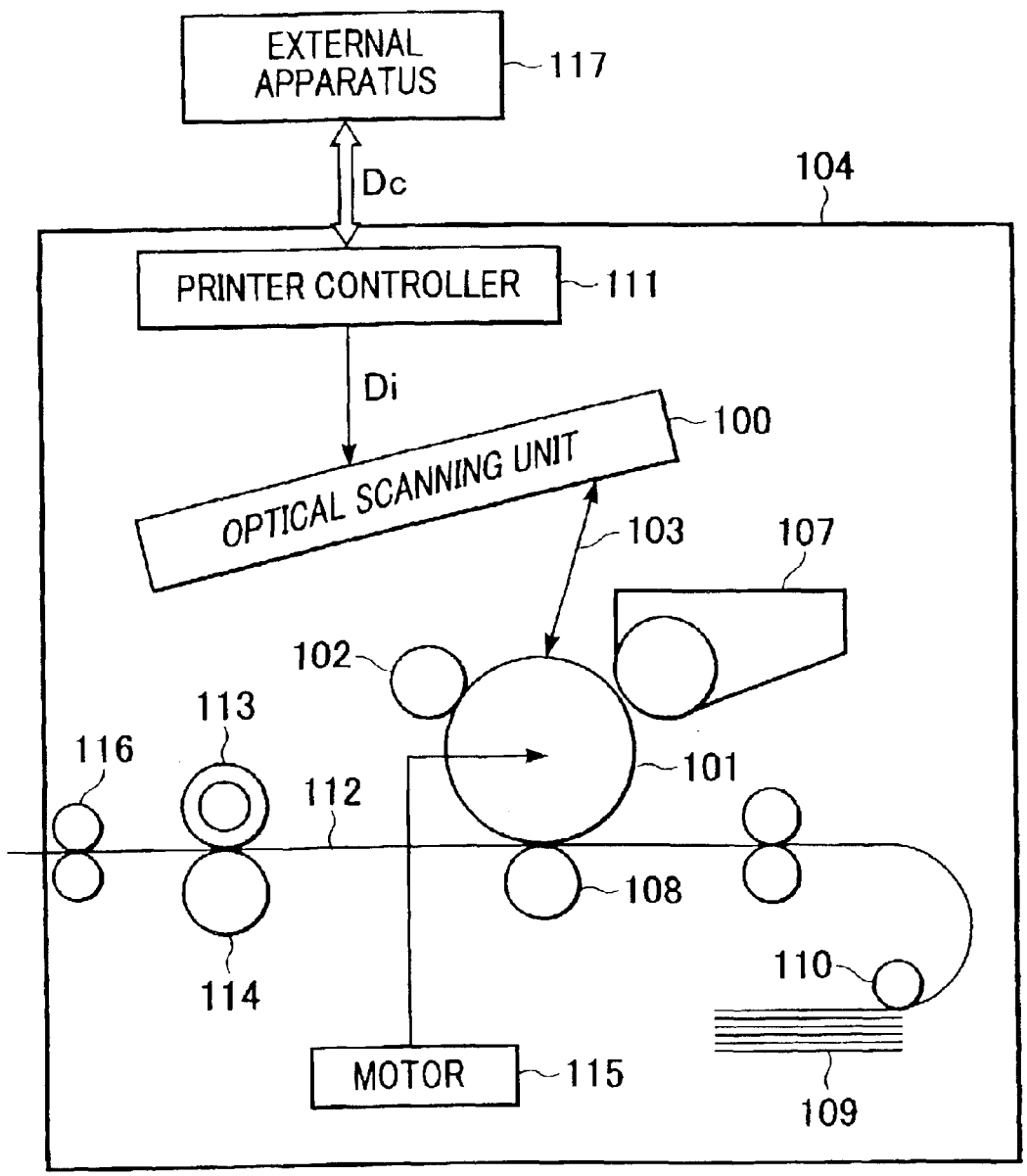
FIG. 5 is a diagram depicting principal components of an image forming apparatus according to the present invention.
Figure 6:
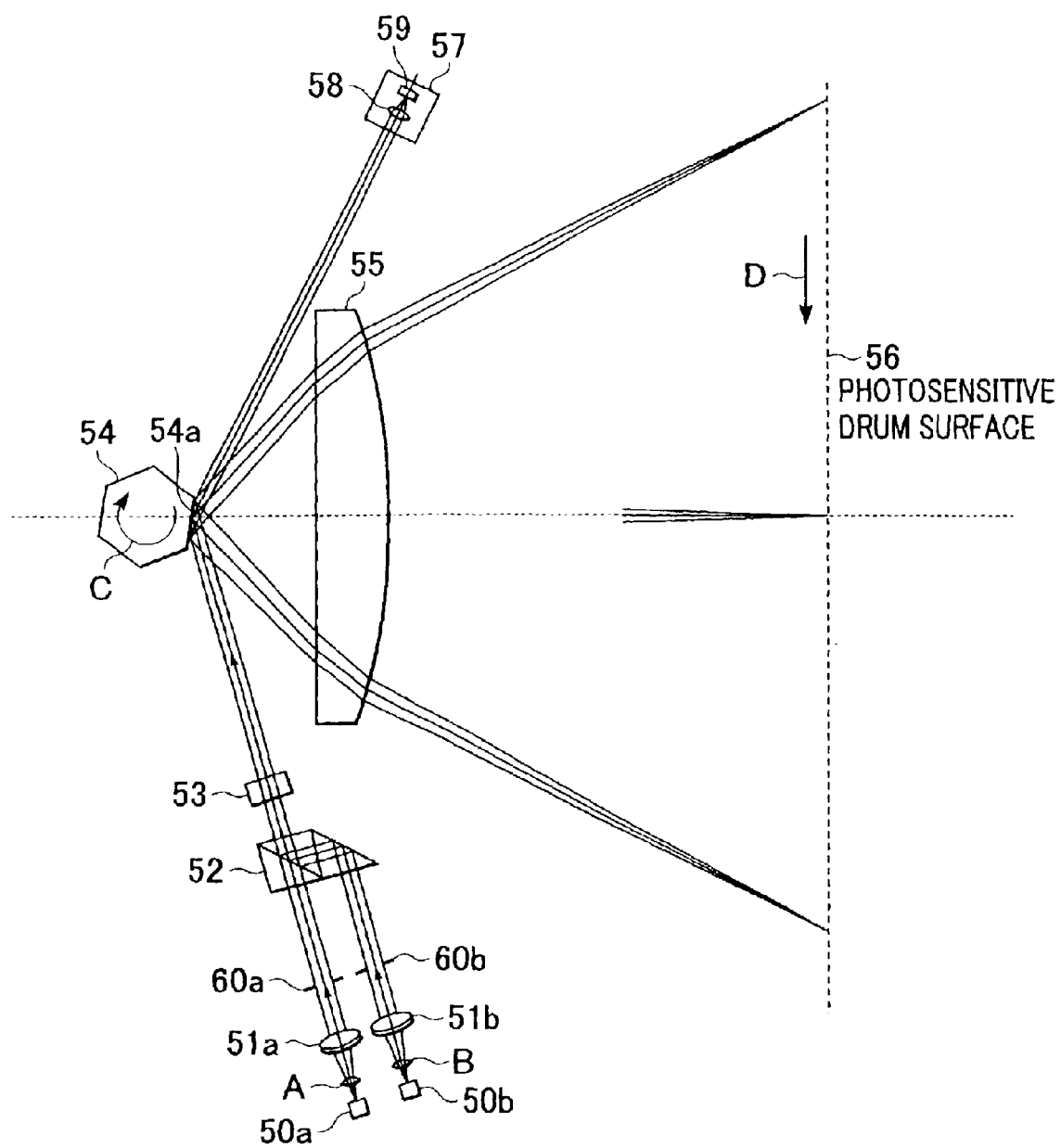
FIG. 6 is a sectional view, taken along the main scanning direction, of a principal portion of a known scanning optical device.
Figure 7:
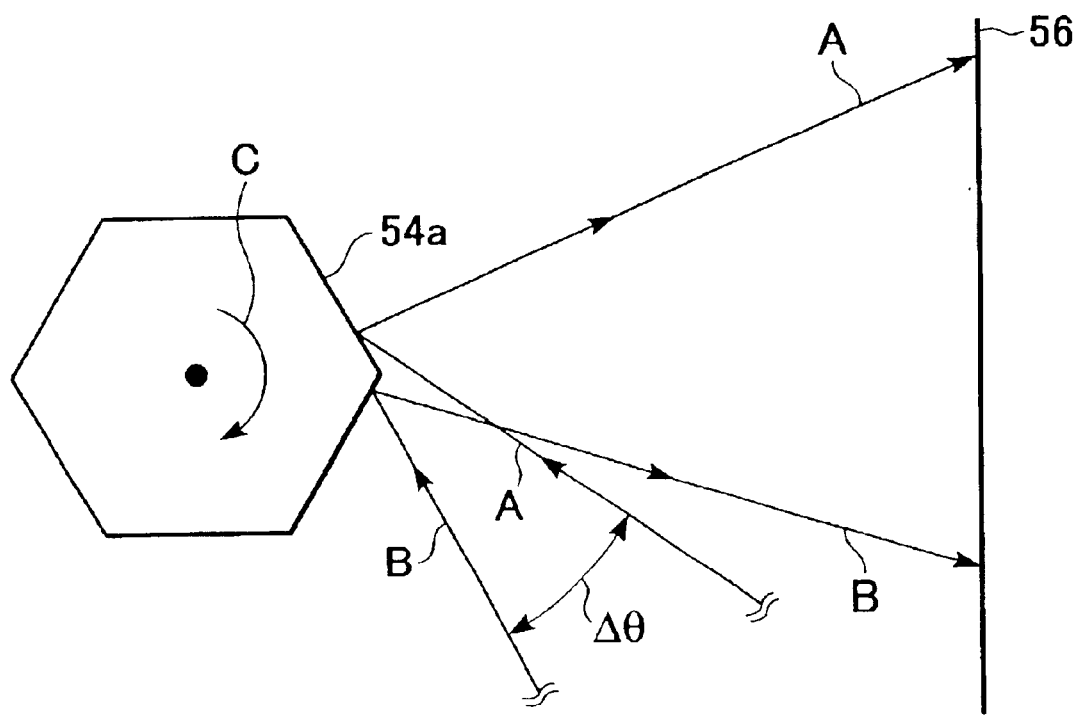
FIG. 7 is a sectional view showing deflection of a plurality of laser beams at deflection surfaces.

FIG. 5 is a diagram depicting principal components of an image forming apparatus (an electrophotographic printer) 104 using the scanning optical device according to the first or second embodiment. An external apparatus 117, such as a personal computer, inputs code data Dc to the image forming apparatus 104. The code data Dc is converted into image data (dot data) Di by a printer controller 111 in the image forming apparatus 104. The image data Di is input to an optical scanning unit (a scanning optical device) 100 having a configuration shown in the first or second embodiment. The optical scanning unit 100 emits a light beam (laser beam) 103, modulated in accordance with the image data Di, to be scanned over a photoreceptor surface of a photosensitive drum 101 in the main scanning direction.

The photosensitive drum 101, which is an electrostatic latent image carrier (a photoreceptor), is rotated clockwise by a motor 115. The rotation of the photosensitive drum 101 causes the photoreceptor surface of the photosensitive drum 101 to move in the sub-scanning direction, which is orthogonal to the main scanning direction, with respect to the laser beam 103. An electrostatically charged roller 102 for evenly charging the surface of the photosensitive drum 101 is provided above the photosensitive drum 101 so that the electrostatically charged roller 102 abuts the surface of the photosensitive drum 101. The laser beam 103 scanned with the optical scanning unit 100 is applied to the surface of the photosensitive drum 101 charged with the electrostatically charged roller 102.

As described above, the laser beam 103 is modulated in accordance with the image data Di, and application of the laser beam 103 forms an electrostatic latent image onto the surface of the photosensitive drum 101. The electrostatic latent image is developed, as a toner image, by a developing device 107. The developing device 107 abuts a portion of the photosensitive drum 101, the portion being at the downstream side of the laser beam 103 in the rotational direction of the photosensitive drum 101.

The toner image developed by the developing device 107 is transferred to paper 112, which is a transfer material, through a transfer roller (transfer device) 108 that faces the photosensitive drum 101, below the photosensitive drum 101. Although the paper 112 is accommodated in a paper cassette 109 disposed in front of the photosensitive drum 101 (the right-hand side of FIG. 5), the paper 112 may be manually fed. A paper feed roller 110 is arranged at one end of the paper cassette 109 to send the paper 112 in the paper cassette 109 through a feeding path.

As described above, the paper 112 to which an unfixed toner image is transferred is fed to a fixing device disposed behind the photosensitive drum 101 (the left-hand side of FIG. 5). The fixing device includes a fixing roller 113 and a pressure roller 114. The fixing roller 113 contains a fixing heater (not shown), and the pressure roller 114 is pressed against the fixing roller 113. The paper 112 fed from the transfer roller 108 is heated and pressed in the press-contacted portion between the fixing roller 113 and the pressure roller 114, so that the unfixed toner image is fixed on the paper 112. A take-off roller 116 is arranged behind the fixing roller 113, thereby ejecting the paper to which the toner image is fixed out of the image forming apparatus 104.

The printer controller 111 controls each unit of the image forming apparatus 104, such as the motor 115, a polygon motor of the optical scanning unit 100, and the like, as well as the data conversion described above, although this is not shown in FIG. 5.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A scanning optical device comprising:
   a plurality of light sources emitting a plurality of laser beams;
   an optical deflector for deflecting the plurality of laser beams with at least one deflection surface thereof;
   an incident optical system for introducing the plurality of laser beams to said optical deflector; and
   a scanning optical system for focusing the plurality of deflected laser beams onto a target surface to be scanned,
   wherein the width of the plurality of laser beams being larger than the width of the deflection surface in a main scanning direction,
   wherein principal rays of the plurality of laser beams, separated by a predetermined angle, cross each other near the deflection surface in a main scanning cross-section, and
   wherein said scanning optical device satisfies the following expression:

$$\Delta\theta < (4\pi/N) \times (1-\rho),$$

where $\Delta\theta$ represents the largest angle between principal rays of two of the plurality of laser beams, N represents the number of deflection surfaces of said optical deflector, and $\rho$ represents the scanning efficiency of the deflection surface, which is the ratio of an image forming range to the theoretical maximum scanning width by one deflection surface of said optical deflector.

2. A scanning optical device according to claim 1, wherein said incident optical system comprises:
   a plurality of collimator lenses, one collimator lens being provided for each of said plurality of light sources; and
   a common cylindrical lens for focusing the plurality of laser beams near the deflection surface in the sub-scanning direction.

3. A scanning optical device according to claim 1, wherein said plurality of light sources are semiconductor lasers, the semiconductor lasers being separated from each other.

4. A scanning optical device according to claim 3, wherein at least one of the semiconductor lasers has a plurality of light-emitting points.

5. A scanning optical device according to claim 1, wherein the plurality of laser beams enters the deflection surface from approximately the center of a deflection angle of said optical deflector.

6. A scanning optical device according to claim 1, wherein said scanning optical system comprises a scanning optical lens.

7. A scanning optical device according to claim 1, wherein said scanning optical system comprises a scanning optical mirror.

8. A scanning optical device according to claim 1, wherein said scanning optical system comprises a diffractive optical element.

9. A scanning optical device according to claim 1, wherein said incident optical system introduces the plurality of laser beams to said optical deflector from within a scanning range.

10. A scanning optical device comprising:
    a plurality of light sources emitting a plurality of laser beams;
    an optical deflector for deflecting the plurality of laser beams with at least one deflection surface thereof;
    an incident optical system for introducing the plurality of laser beams to said optical deflector; and
    a scanning optical system for focusing the plurality of deflected laser beams onto a target surface to be scanned,
    wherein said incident optical system introduces the plurality of laser beams to said optical deflector from within a scanning range, wherein principal rays of the plurality of laser beams, separated by a predetermined angle, cross each other near the deflection surface in a main scanning cross-section, and wherein said scanning optical device satisfies the following expression:

$$\Delta\theta < (4\pi/N) \times (1-\rho),$$

where $\Delta\theta$ represents the largest angle between principal rays of two of the plurality of laser beams, N represents the number of deflection surfaces of said optical deflector, and $\rho$ represents the scanning efficiency of the deflection surface, which is the ratio of an image forming range to the theoretical maximum scanning width by one deflection surface of said optical deflector.

11. A scanning optical device according to claim 10, wherein the plurality of laser beams cross after the deflection surface of said optical deflector.

12. A scanning optical device according to claim 10, wherein said scanning optical system comprises an optical lens.

13. A scanning optical device according to claim 10, wherein said scanning optical system comprises a scanning optical mirror.

14. A scanning optical device according to claim 10, wherein said scanning optical system comprises a diffractive optical element.

15. An image forming apparatus comprising:
   the scanning optical device as set forth in any one of claims 1 to 14;
   a photoreceptor arranged on the target surface to be scanned;
   a developing device for developing an electrostatic latent image formed on said photoreceptor by the laser beams scanned by said scanning optical device as a toner image;
   a transfer device for transferring the developed toner image to a transfer material; and
   a fixing device for fixing the transferred toner image onto the transfer material.

16. An image forming apparatus comprising:
   the scanning optical device as set forth in any one of claims 1 to 14; and
   a printer controller for converting code data input from an external apparatus into an image signal and causing the image signal to be input to said scanning optical device.

* * * * *

UNITED STATES PATENT AND TRADEMARK OFFICE
CERTIFICATE OF CORRECTION

PATENT NO. : 6,882,404 B2
DATED : April 19, 2005
INVENTOR(S) : Seiichiro Mori et al.

Page 1 of 1

It is certified that error appears in the above-identified patent and that said Letters Patent is hereby corrected as shown below:

<u>Column 8,</u>
Line 16, "of a" should read -- of α --.

Signed and Sealed this

Thirteenth Day of September, 2005

JON W. DUDAS
*Director of the United States Patent and Trademark Office*